United States Patent [19]

Simpson

[11] 3,767,845

[45] Oct. 23, 1973

[54] COLOR IMAGE REPRODUCING APPARATUS

[75] Inventor: Theodore Frederick Simpson, Lancaster, Pa.

[73] Assignee: RCA Corporation, New York, N.Y.

[22] Filed: Nov. 17, 1970

[21] Appl. No.: 90,346

[52] U.S. Cl. .......................... 178/5.4 R, 178/5.4 F

[51] Int. Cl. .......................... H04n 9/22

[58] Field of Search .......................... 178/5.4 R, 5.4 F, 178/7.5 DC; 315/13 GG

[56] References Cited

UNITED STATES PATENTS

| | | | |
|---|---|---|---|
| 2,580,073 | 12/1951 | Burton | 178/5.4 PE |
| 3,522,368 | 7/1970 | Smith | 178/5.4 PE |
| 2,743,313 | 4/1956 | Schwartz | 178/7.5 DC |
| 3,272,914 | 9/1966 | Moles et al. | 178/7.5 DC |
| 3,524,013 | 8/1970 | Hillman | 178/5.4 R |
| 2,845,573 | 7/1958 | Macouski | 315/13 CG |
| 2,887,528 | 5/1959 | Rhodes | 178/5.4 F |
| 3,213,190 | 10/1965 | Mutschler | 178/5.4 F |

OTHER PUBLICATIONS

Patchett, Colour Television, Norman Price (Publishers) Ltd., 1968, pp. 170, 171.

Towers, Transistor Television Receivers, Rider Publisher, Inc., 1963, pp. 56–58.

*Primary Examiner*—Robert L. Griffin
*Assistant Examiner*—John C. Martin
*Attorney*—Eugene M. Whitacre

[57] ABSTRACT

Different values of resistance are sequenced into an attenuator network to vary the amplitude of a video signal applied to a single-gun cathode-ray tube color television receiver to offset differences in phosphor efficiency and control the proportionality of reproduced white obtained.

3 Claims, 4 Drawing Figures

Inventor:
THEODORE F. SIMPSON

BY Charles Brodsky
Attorney

Inventor:
THEODORE F. SIMPSON
BY Charles Brodsky
Attorney

COLOR IMAGE REPRODUCING APPARATUS

BACKGROUND OF THE INVENTION

1. Field of the Invention

This invention relates to apparatus for reproducing color images, in general, and to control apparatus for offsetting differences in phosphor efficiency in a single-gun cathode-ray tube, in particular.

2. Description of the Prior Art

As is well known, such single-gun tubes employ a translucent face member, upon which are selectively disposed different phosphors which luminesce in different colors in response to bombardment by the cathode-ray beam. One-third of the total number of phosphors may be characterized as responding to such electron bombardment to emit red light, another one-third as responding to such bombardment to emit blue light, and the remaining one-third as will produce green light when impinged by the electron beam. These phosphors may be arranged upon the tube face in adjacent color triplets, so that each of the three phosphors are successively encountered—in the red, blue, green order, for example—by a horizontally sweeping cathode-ray beam. By fabricating the phosphors to be both sufficiently narrow and sufficiently closely spaced, the portions of each group impinged by the beam on a horizontal scan may be considered to comprise a picture element since the colors of the three successive phosphors will be integrated by the eye of an observer located at a normal viewing distance. As is also known, the color which the eye sees depends upon the brightnesses of the three lights emitted by the component phosphors, such that white, for example, will be seen when the light emitted by the green phosphor individually appears approximately twice as bright as the light emitted by the red phosphor and some six-to-ten times as bright as the light emitted by the blue phosphor. Different degrees of "white" are also known to exist depending on the mixture of the red, green and blue colors and, further, upon the various efficiencies of the individual phosphors themsleves. Thus, while a 59 percent green, 30 percent red and 11 percent blue might produce a white corresponding to "illuminant C" for one efficiency of phosphors chosen, a differnt efficiency might produce less than this "whitest" white, but a "tinted" white.

SUMMARY OF THE INVENTION

As will become clear hereinafter, one embodiment of the present invention offsets these differences in phosphor efficiency by sequential control of resistance to vary the amplitude of video signal drive voltage coupled to the single-gun color picture tube on sequential scan lines or fields in an NTSC system. In one instance, the various resistances may be electronically switched in parallel with the signal path, to form a variable shunt which changes the video signal amplitude and the relative cathode-ray beam intensity to control the light output from the individual phosphors. As will similarly become clear, though particularly useful in a color television receiver environment to provide the desired proportionality of white reproduced, the present invention is equally applicable for use in any reproduction of single-gun cathode-ray image where enhancement of one color to the exclusion of others is desired. Thus, in a single-gun kinescope employed as a computer read-out tube providing red and white images, for example, the control apparatus of the invention can be employed to provide such beam intensity variations as would reinforce the red display relative to that of the reproduced white.

DESCRIPTION OF THE DRAWINGS

These and other advantages of the invention will become clear from the following description taken in connection with the accompanying drawings in which.

DETAILED DESCRIPTION OF THE DRAWINGS

Figures 1, 2, 3:
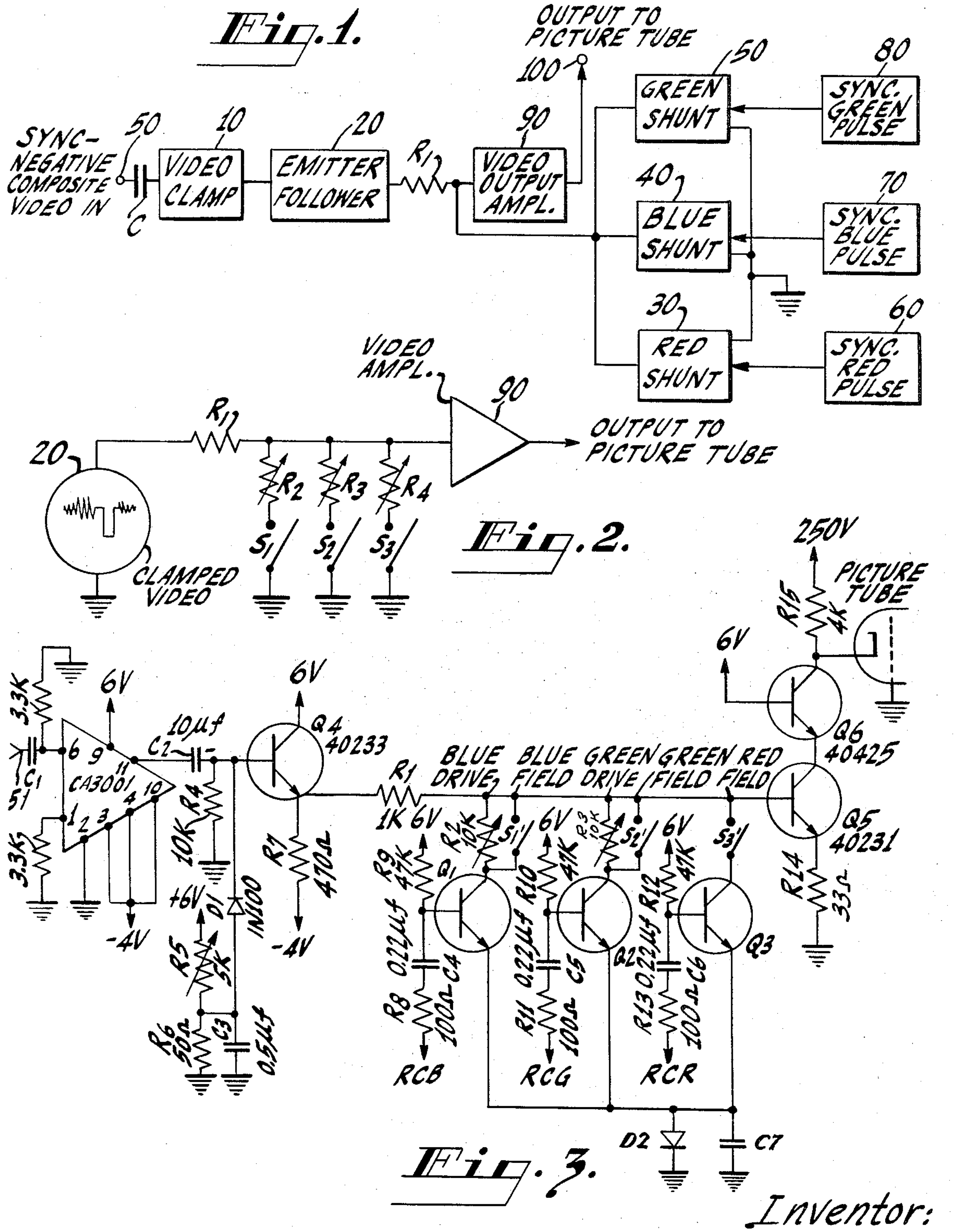
FIG. 1 is a block diagram of one embodiment of the present invention.
FIG. 2 is a simplified equivalent circuit diagram of a portion of the embodiment of FIG. 1.
FIG. 3 shows a schematic circuit diagram of the control apparatus equivalently represented by the simplified diagrams of FIGS. 1 and 2.

Referring now to FIG. 1, the block diagram shown illustrates one embodiment of the invention useful either in a field-sequential color television receiver or in a line-sequential receiver to vary the amplitude of video signal applied to the single-gun kinescope commonly found in such apparatus. As indicated in the drawing, a composite video signal having negative-going synchronizing pulses is supplied at an input terminal 50 and is coupled by a capacitor C to a video clamp circuit 10. The composite video signal may be taken from any point in the sequential receiver at which the blanking pulses, luminance signal, and color difference signal information exists, and is capacitively coupled to the block 10 which serves to clamp the most negative portion of the blanking pulse signal. Such clamping will be appreciated as maintaining the proper direct current level of the video signal, with the output of the clamp 10 then being coupled to an emitter follower block 20. Such emitter follower 20 is included to reduce the loading effects of the resistance shunts which follow in the signal attenuation path. A resistor $R_1$ is connected to an output terminal of the follower 20 to form one portion of a signal attenuator network which, together with the resistance shunts, serves to vary the amplitude of the video signal ultimately applied to the kinescope.

Blocks 30, 40, and 50 illustratively represent the resistance shunts, with each being connected between resistor $R_1$ and a point of reference potential 75 (such as ground) in response to the operation of three pulse generating blocks 60, 70 and 80. As shown, block 60 is characterized as generating a pulse when the single-gun kinescope is to energize the red phosphors on the tube face, and is connected to the shunt resistance block 30 to complete the attenuator with resistor $R_1$, which varies the video signal drive at the time of such electron beam bombardment of such phosphor. Similarly, the pulse generating block 70 is associated with the scanning of the blue phosphors, and controls in like manner the insertion of the resistance shunt 40 to vary the video signal drive causing energy bombardment of the blue phosphor. The pulse generating block 80 is likewise concernred with inserting the resistance shunt 50 to vary the signal drive when the cathode-ray beam is to scan the green phosphor. As will become clear below, the gating blocks 6, 70 and 80 generate pulses sequentially—either at the line or field rate depending upon the type of switching employed—such that only one of the resistance shunts 30, 40, 50 is incorporated within the attenuator network at any given time and such that the insertion of each resistance shunt proceeds in an orderly manner.

In this manner, gating block 60 will generate its pulse to couple the "red" resistance shunt 30 into the attenuator at substantially the same time that "red" signal information will be applied to the input terminal 51. On the next line or field, the red gating pulse will end and the generating circuit 70 will produce its pulse to insert the "blue" shunt resistnace 40 into the signal path, and at substantially the same time that "blue" signal information is applied to terminal 51. On the next line or field, the gating pulse supplied by the circuit 70 will terminate and the gating circuit 80 will generate its pulse to insert the "green" shunt resistance 50 into the signal path, coinciding with the application of "green" information to input terminal 51. Thus, resistance $R_1$ together with the resistance shunts 30, 40 and 50 form an attenuator network which can be independently controlled for the desired level of "red" signal drive, "blue" signal drive, or "green" signal drive merely by varying the values of the three resistance shunts in order.

The output of the attenuator is then coupled to a video amplifier 90 to increase the overall signal drive to the picture tube, represented by the output terminal 100. Although not shown as such, it will be appreciated that proper operation requires the gating circuits 60, 70, and 80 to be so synchronized with the composite video signal applied to terminal 51 that the appropriate red, blue or green gating pulse is generated at the time that red, blue or green video information is being processed.

This apparatus may be further understood by reference to the simplified equivalent circuit diagram of FIG. 2. As shown, the clamped video signal developed by the emitter follower 20 is coupled to the resistance $R_1$, forming a portion of an attenuator also including resistances $R_2$, $R_3$ and $R_4$, which respectively represent the "red" resistance shunt 30, the "blue" resistance shunt 40 and the "green" resistance shunt 50. Each of these resistances $R_2$, $R_3$ and $R_4$ may be connected into the attenuator network by switches $S_1$, $S_2$ and $S_3$, which correspond to the synchronized gating circuits 60, 70 and 80 of FIG. 1, respectively. If the synchronized switches $S_1$, $S_2$ and $S_3$ are each held in their open position, then resistances $R_2$, $R_3$ and $R_4$ have substantially no effect on the circuit operation. However, in general operation, the switches $S_1$, $S_2$ and $S_3$ will be sequentially closed, one at a time, such that when synchronized switch $S_1$ is closed, the clamped video signal will be attenuated by an amount $R_2/R_1 + R_2$ . If resistance $R_2$ is then made variable, the output of the attenuator can be adjusted to any value between zero and the voltage of the clamped video signal to adjust the "red" signal drive. Similarly, if the synchronization is such as to close switch $S_2$ while opening switches $S_1$ and $S_3$, then the clamped video signal input will be attenuated by an amount $R_3/R_1 + R_3$ to vary the "blue" signal drive. If the synchronization then closes switch $S_3$ and opens switches $S_1$ and $S_2$, the clamped video signal input will be attenuated by $R_4/R_1 + R_4$ to vary the "green" signal drive, again illustrating that only one switch will be closed at any given instant of time and with that switch corresponding to the color being reproduced on the face of the phosphor screen. The output of the attenuator is then coupled to a video amplifier 90 as in the arrangement of FIG. 1 to raise the signal voltage to that level adequate to drive the single-gun cathode-ray tube.

Figure 4:
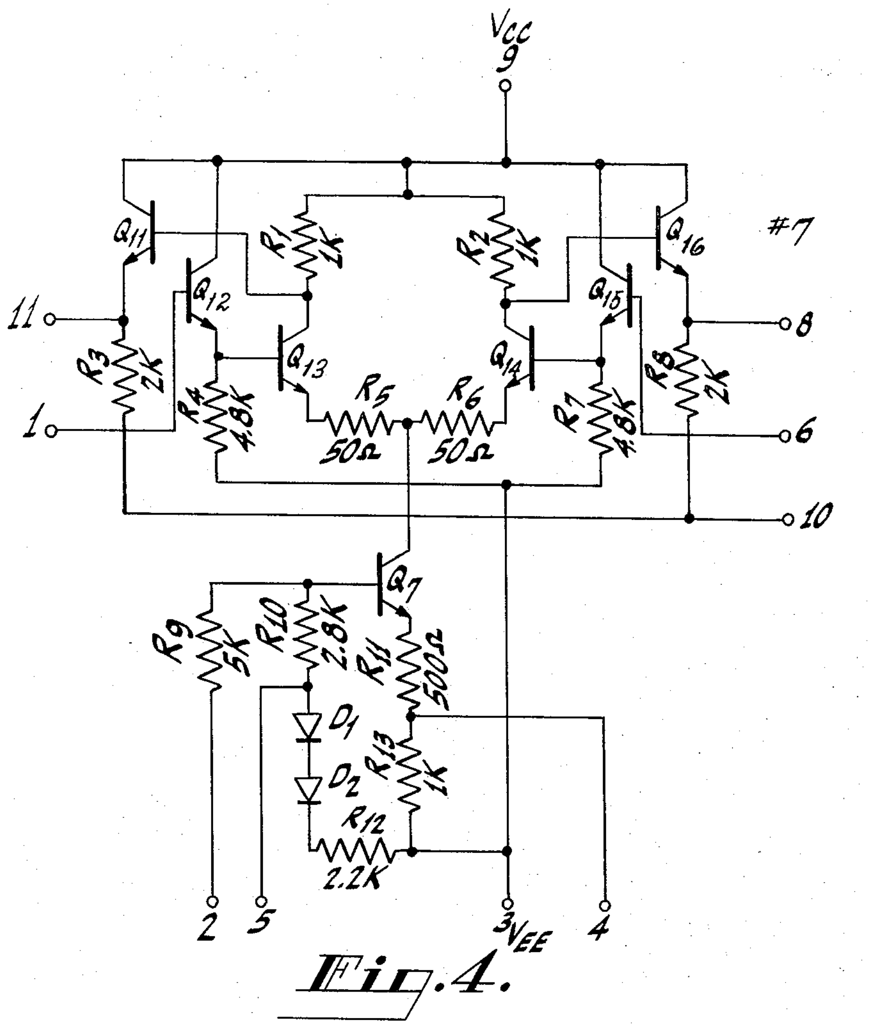
FIG. 4 is a schematic circuit diagram of the input amplifier of FIG. 3.

The schematic circuit diagram of FIG. 3 includes an integrated circuit input amplifier CA 3001 available from the RCA Corporation. The schematic arrangement of such amplifier is shown in FIG. 4, and illustrates, for purposes of clarity, one type of input amplifier which might be incorporated in the operation of the invention. As shown, the composite video signal supplied at terminal 51 in FIG. 3 is coupled through the capacitor $C_1$ to terminal 6 of the CA 3001 integrated chip, such circuit being fully described in the 1967 publication of the RCA Corporation entitled "RCA Linear Integrated Circuits," starting at page 92, which is herein incorporated by reference. Output signals are developed at terminal 11, and are coupled through a capacitor $C_2$ to the base electrode of a transistor $Q_4$. Also coupled to the base electrode of the transistor $Q_4$ are a resistor $R_4$, referenced to a point of ground potential, and the cathode of a semiconductor rectifier $D_1$, the anode of which is coupled to ground by a capacitor $C_3$. The anode of rectifier $D_1$ is also coupled to the junction between a pair of resistors $R_5$ and $R_6$ coupled between a first source of energizing potential (+6V) and ground. As shown, resistor $R_5$ is adjustable to vary the bias on transistor $Q_4$. This arrangement—including capacitors $C_2$ and $C_3$, resistors $R_4$, $R_5$ and $R_6$, and the rectifier $D_1$—forms the video clamp corresponding to block 10 of FIG. 1 The rectifier $D_1$ serves to clamp the negative tips of supplied blanking pulses to the voltage formed by the divider resistors $R_5$ and $R_6$, filtered by capacitor $C_3$.

Transistor $Q_4$ is arranged as an emitter follower so as to maintain the effectiveness of the clamp circuit in the presence of added shunt resistance inserted into the signal processing path. As such, the collector electrode of transistor $Q_4$ is connected to the first source of energizing potential (+6V for the transistor polarity shown) while the emitter electrode is coupled to a second source of opposite potential (−4V) by means of a resistor $R_7$. Such emitter follower transistor provides a high load impedance at its base electrode while its emitter electrode is, as indicated, also coupled through a resistor $R_1$ (comparable to that shown in FIGS. 1 and 2) to the shunt resistance circuits to be described below. If negative-going pulses of variable height are coupled with the composite video signal at terminal 51, the arrangement as thus far described serves to add a direct current component in the output as the rectifier $D_1$ will clamp to them rather than to the blanking pulses. Since this direct current component will be attenuated by the inserted resistances in the same ratio as the video signal being processed, the arrangement provides a variable direct current control which is proportional to the drive level of the video signal. This serves to provide a brightness control arrangement in the sequential display system.

In the discussion that follows, it will be understood that in the preferred embodiment of the invention shown in FIG. 3, signal drive for the red phosphor is to occur without any attenuation, as the efficiency of many such phosphors presently available are significantly lower than corresponding efficiencies of blue and green phosphors. Thus, although the invention has been generally described in terms of varying cathode-ray tube signal drive to vary electron beam bombardment of each red, blue and green phosphor unit, only attenuation of the blue and green signal drive is provided by the specific construction of FIG. 3. In particular, the "blue" and "green" resistance shunts 40, 50 illustrated in FIG. 1 are represented by the variable resistors $R_2$ and $R_3$ of FIG. 3 respectively, while no resistor in FIG. 3 compares to the "red" resistance shunt 30 of FIG. 1.

As shown, variable resistor $R_2$ is coupled between the end of resistor $R_1$ remote from transistor $Q_4$ and the collector electrode of a further transistor $Q_1$. Bias potential is supplied the base electrode of transistor $Q_1$ through resistor $R_9$ coupling that electrode to the first source of energizing potential (+6V). Also coupled to the base electrode of transistor $Q_1$ are a capacitor $C_4$ and a resistor $R_8$ forming an input circuit for the gating signals applied to terminal RCB by the gating circuit 70 of FIG. 1. Lastly, the emitter electrode of transistor $Q_1$ is coupled to ground, by a capacitor $C_7$ in one instance, and by a semiconductor rectifier $D_2$ having its cathode electrode at ground potential, in a second instance.

In like manner, the "green" shunt resistance 50 of FIG. 1 is represented by a variable resistor $R_3$ coupling the end of resistor $R_1$ remote from transistor $Q_4$ to the collector electrode of an additional transistor $Q_2$. Bias potential is applied to the base electrode of this transistor through a resistor $R_{10}$ returned to the +6V source of energizing potential, with the gating signals generated by the circuit 80 of FIG. 1 being applied to the same base electrode by a terminal RCG serially coupled to the base by a resistor $R_{11}$ and capacitor $C_5$. The emitter electrode of transistor $Q_2$ is shown directly connected to the corresponding electrode of transistor $Q_1$, and to the emitter electrode of a further transistor $Q_3$.

Transistor $Q_3$ serves as part of the gating circuit 60 of FIG. 1 for controlling the red signal drive to the single-gun picture tube, and has a base electrode to which the +6V source of energizing potential is coupled by means of a resistor $R_{12}$ and to which the red gating pulses are supplied through terminal RCR and the coupling circuit including resistor $R_{13}$ and capacitor $C_6$ in series connection. Each of the collector electrodes of the transistors $Q_1$, $Q_2$ and $Q_3$ are further coupled to the end of resistor $R_1$ which is remote from transistor $Q_4$ by switches $S_1'$, $S_2'$, $S_3'$, respectively, to provide an auxiliary service function by means of which one or more of the sequential video drive signals may be shorted to ground. As indicated in the drawing, these switches $S_1'$, $S_2'$, and $S_3'$ are referred to as the blue, green and red "field" switches, and are to be understood as differing in function from the correspondingly numbered switches shown in FIG. 2.

As will be readily apparent from the drawing, resistors $R_8 - R_{13}$, capacitors $C_4 - C_6$, and transistors $Q_1 - Q_3$ form synchronized switches which operate the shunt resistors $R_2$, $R_3$ and, in general, the variable resistor that would be employed to couple the collector electrode of transistor $Q_3$ to the resistor $R_1$ when some degree of red signal drive attenuation is desired. As will also be apparent, with the polarities shown, transistors $Q_1 - Q_3$ will conduct only when a positive-going pulse is applied to their base electrodes, such that when rendered conductive, these transistors couple the ends of the shunt resistors closer to their collector electrodes to a point of AC ground through capacitor $C_7$. The controllable attenuation of the video drive signal is then accomplished by varying the resistance value of the resistors $R_2$ and $R_3$ for the arrangement shown. As noted above, transistors $Q_1 - Q_3$ are sequentially fed these positive-going pulses either at a line scanning rate or at a field scanning rate and in a manner such that the "ON" transistor is sequenced through the chain ($Q_1$, $Q_2$, then $Q_3$). As one after another of the transistor switches are rendered conductive, each of the resistors $R_2$, $R_3$ (and the "red" shunt resistor when used) is brought into the circuit connection to vary the degree of attenuation. The video signal so attenuated may then be coupled to a video amplifier, shown in the drawing as incorporating transistors $Q_5$ and $Q_6$.

In particular, the base electrode of transistor $Q_5$ is also coupled to the end of resistor $R_1$ remote from transistor $Q_4$, while the emitter electrode of transistor $Q_5$ is coupled to ground through a resistor $R_{14}$. The collector electrode of transistor $Q_5$ is directly connected to the emitter electrode of a further transistor $Q_6$, the base electrode of which is directly connected to the +6V source of energizing potential. As shown, the collector electrode of this further transistor $Q_6$ is coupled to a source of B+ potential (+250V for the polarity shown) and to the cathode electrode of the single-gun cathode-ray picture tube. This arrangement is included such that sufficient signal level and polarity exists to properly drive the single-gun tube. Although not serving as essential parts of the present invention, it will be appreciated that capacitor $C_7$ and rectifier $D_2$—which each couple the transistor switch emitter electrodes to ground—are used to offset the dynamic ground point of these switches so as to compensate for the base-emitter offset voltage of transistor $Q_5$. Such compensation permits conduction of transistors $Q_5$ and $Q_6$ for lower magnitude signal voltages then would be the case if rectifier $D_2$ were omitted, for example.

The gating pulse sources shown by the terminals RCB, RCG and RCR of FIG. 3 are effective to supply sequenced pulses as described previously. Such pulses may be obtained from readily constructed multivibrator circuits or from similar ring counters which are pulsed at the rate at which the system is to operate (e.g., line rate or field rate), and are synchronized by horizontal or vertical scanning signals available in the television receiver in accordance with the scanning rate selected. Similarly, it will be seen that the adjustable bias provided by resistor $R_5$ not only serves to adjust the clamping point of the video signal output of transistor $Q_4$, but will additionally vary the bias on the picture tube during trace time due to the fact that the transistor amplifier $Q_4$ is direct current coupled to the picture tube cathode. As will be readily apparent, video signal polarities at input terminal 50 may be reversed such that corresponding polarity changes within the circuit configuration will enable the picture tube to be driven by signals applied to its control grid electrode, rather than by signals coupled to its cathode as shown in the drawing.

It will also be apparent that the arrangement described is quite useful in making available those receiver setup controls which are usually present in a color television set. As was described above, a brightness control can be included by adding pulses of controllable height before the video clamping stage including transistor $Q_4$, while contrast controls may be obtained by varying the luminance component of the video signal added before that stage. Color control may additionally be incorporated by varying the color difference signal component added before the clamping arrangement. Because a single-gun cathode-ray kinescope is employed, it will be apparent that no necessity exists to have any sort of cutoff control other than the bias adjustment provided by resistor $R_5$.

While the arrangement of FIG. 3 has been tested and found quite attractive for use in a single-gun line-sequential color television display, it will be obvious to one skilled in the art that the system could be useful in many applications where it is desired to regularly vary an output signal amplitude in discrete, individually adjustable steps. Other communications systems might just as easily be envisioned in which the synchronized gating pulses provided are of varying widths to remotely or manually control signal gain so that the output signal amplitude may be varied at a regular rate. In such instances—as well as in others—, minor circuit variations can be made, such as the use of field-effect transistors for the synchronized switches $Q_1$ – $Q_3$ instead of the bi-polar transistors shown. The synchronized pulses from the ring counter or other multivibrator source might be combined with these transistors in a single integrated chip, as another alternative. Similarly, by suitable choice of resistance values for resistor $R_1$ and for the "blue," "green" and "red" resistance shunts, the loading effect on the rectifier clamp $D_1$ can be reduced to that point where elimination of the emitter follower transistor $Q_4$ is possible. In like manner, if adequate input signal level is present in the system, it becomes unnecessary to include the CA 3001 integrated circuit as its employment in the described arrangement is essentially only for purposes of video amplification in the particular arrangement constructed. And, as was previously mentioned, the arrangement of the output amplifiers $Q_5$ and $Q_6$ can be modified so as to provide grid drive for the picture tube employed.

While there has been described what is considered to be a preferred embodiment of the present invention, it will also be apparent that other modifications can be made without departing from its teaching that different values of resistance can be sequenced into an attenuator network to control energy bombardment of the color phosphors of a single-gun cathode-ray color kinescope in a manner to offset differences in phosphor efficiency. Thus, the arrangement of FIG. 3 might be modified to couple the variable "green," "blue" and "red" resistances in series between a source of negative potential and the control grid of the single-gun tube, and to couple the input video signal either directly to the cathode of the tube or through an amplifying arrangement such as shown by the stage including transistors $Q_5$ and $Q_6$. The synchronizing control pulses applied at the terminals RCB, RCG and RCR can then function as before, to successively switch the desired resistance into the circuit to vary the DC bias on the picture tube. As will be evident, selective adjustment of each of these variable resistances can serve to adjust the beam current in the kinescope just as with the FIG. 3 AC signal drive arrangement and vary the resultant light emitted from any or all of the scanned phosphors.

What is claimed is:

1. In a color display system providing image components of different colors in response to the application of respective color signals to a cathode-ray tube having a single electron gun and a translucent face member upon which are selectively disposed different phosphors which luminesce in different colors, corresponding ones of which emit light of a first color when energized by an impinging electron beam projected from said gun and scanned across corresponding phosphors at a given rate to energize each of said phosphors in a sequential manner before repeating to energize each of different corresponding ones of said phosphors which emit light of a second color, and wherein said color signals include blanking pulses, luminance information and color difference signal information, the improvement comprising:

means synchronized with said sequential beam scanning and cooperating with the application of said color signals to said electron gun and with the application of operating bias voltage thereto to selectively vary the instantaneous potential difference existing between the control grid and cathode electrodes of said single-gun for each desired impingement of corresponding phosphors, to intensity modulate in a controllable fashion the energy in the beam projected by said gun by a predetermined amount so as to enhance the light emitted from said one series of correspondingly colored phosphors relative to the light emitted from said other, different series of correspondingly color phosphors, said means including:

a diode clamp coupled to a transistor follower circuit for responding to said supplied color signals and for providing an output signal corresponding thereto with the peaks of the blanking pulses of said output signal being stabilized at a predetermined voltage;

an attenuator network coupled to receive said output signal and for varying its amplitude prior to application between the control grid and cathode electrodes of said single gun, one of which electrodes is biased to a substantially fixed potential and to the other of which electrode said attenuated output signal is applied;

and means for applying a variable bias voltage to said diode clamp to adjust the voltage at which the peaks of said blanking pulses are stabilized;

said diode clamp, said transistor follower circuit, said attenuator network and said cathode-ray tube being direct current coupled such that stabilized black level operation results in said cathode-ray tube in the presence of color signal amplitude variations as a result of said clamping and such that the brightness of said tube can be adjusted by controlling the direct voltage at said other electrode of said gun as a function of the variable bias voltage applied.

2. The improvement of claim 1 for use in a color television receiver display system in which the translucent face member of said cathode-ray tube has disposed thereon a plurality of blue light emitting phosphors and green light emitting phosphors, each of greater efficiency than that of an included plurality of red light emitting phosphors, and wherein said attenuator network is synchronized with said sequential beam scanning to reduce the amplitude of those color signals which, when applied to said tube, cause energy bombardment of said blue and green phosphors without substantially affecting the amplitude of those color signals which cause energy bombardment of said red phosphors when applied to said cathode-ray tube.

3. The improvement of claim 2 wherein said attenuator network incorporates first and second variable resistors selectively controllable to vary the amplitude of said color signals which produce components of blue and green colors when causing energy bombardment of correspondingly colored phosphors, and wherein said variable resistors are inserted within said attenuator network by means of transistor switches actuated in synchronism with the scanning of said impinging electron beam across said blue and green phosphors, respectively.

* * * * *